(12) United States Patent
Mori

(10) Patent No.: US 9,631,878 B2
(45) Date of Patent: Apr. 25, 2017

(54) PROCESS FOR PRODUCING ALUMINUM ALLOY TUBE HAVING SACRIFICIAL ANTICORROSION LAYER AND JOINING LAYER

(75) Inventor: Kensuke Mori, Chiyoda (JP)

(73) Assignee: UACJ Corporation, Chiyoda-Ku (JP)

( * ) Notice: Subject to any disclaimer, the term of this patent is extended or adjusted under 35 U.S.C. 154(b) by 388 days.

(21) Appl. No.: 14/371,142

(22) PCT Filed: Aug. 1, 2012

(86) PCT No.: PCT/JP2012/069588
§ 371 (c)(1),
(2), (4) Date: Aug. 11, 2014

(87) PCT Pub. No.: WO2014/020722
PCT Pub. Date: Feb. 6, 2014

(65) Prior Publication Data
US 2015/0041112 A1 Feb. 12, 2015

(51) Int. Cl.
*F28F 21/08* (2006.01)
*B23K 35/40* (2006.01)
(Continued)

(52) U.S. Cl.
CPC ........ *F28F 21/081* (2013.01); *B23K 35/0222* (2013.01); *B23K 35/0244* (2013.01);
(Continued)

(58) Field of Classification Search
CPC .......... B23K 35/40; B23K 35/22; C23C 4/06; C23C 4/08; C23C 4/067; F28F 21/084
See application file for complete search history.

(56) References Cited

U.S. PATENT DOCUMENTS 4,981,526 A    1/1991  Kudo
5,594,930 A *  1/1997  Terada ............... B23K 35/0238
                                                   228/183

FOREIGN PATENT DOCUMENTS

JP    3-106595 A    5/1991
JP    3-114660 A    5/1991
(Continued)

OTHER PUBLICATIONS

International Search Report mailed Oct. 23, 2012, issued in corresponding International Application No. PCT/JP2012/069588, filed Aug. 1, 2012, 5 pages.

*Primary Examiner* — Jason L Vaughan
*Assistant Examiner* — Amanda Meneghini
(74) *Attorney, Agent, or Firm* — Christensen O'Connor Johnson Kindness PLLC

(57) ABSTRACT

Provided is an aluminum alloy tube with superior corrosion resistance and a joining layer for brazing. In addition, a heat exchanger using a fin which utilizes a bare material of low cost and higher availability, rather than a clad material, is provided. A manufacturing method of an aluminum alloy tube, including the steps of forming a sacrificial anticorrosion layer comprising Zn, by ark spraying Zn with purity of 95% or more, onto a surface of aluminum alloy tube with a spraying amount of 3 to 10 $g/m^2$ and a spraying speed of $150 \times 10^3$ to $350 \times 10^3$ mm/sec; and forming a joining layer for brazing by applying a joining material for brazing comprising a mixture obtained by mixing Si powder with purity of 95% or more and flux, onto a surface of the sacrificial anticorrosion layer, so that the amount of the Si powder is 1.2 to 3.0 $g/m^2$, is provided.

4 Claims, 2 Drawing Sheets

(51) Int. Cl.
    *B23K 35/22*     (2006.01)
    *F28F 19/06*     (2006.01)
    *B23K 35/36*     (2006.01)
    *B23K 35/02*     (2006.01)
    *F16L 9/02*     (2006.01)
    *C23C 4/18*     (2006.01)
    *C23C 24/08*     (2006.01)
    *F28F 1/02*     (2006.01)
    *F28F 1/04*     (2006.01)
    *C23C 4/067*     (2016.01)
    *C23C 4/131*     (2016.01)

(52) U.S. Cl.
    CPC ............ *B23K 35/22* (2013.01); *B23K 35/226* (2013.01); *B23K 35/3605* (2013.01); *B23K 35/40* (2013.01); *B23K 35/404* (2013.01); *C23C 4/067* (2016.01); *C23C 4/131* (2016.01); *C23C 4/18* (2013.01); *C23C 24/082* (2013.01); *F16L 9/02* (2013.01); *F28F 1/022* (2013.01); *F28F 1/04* (2013.01); *F28F 19/06* (2013.01); *F28F 21/084* (2013.01); *F28F 21/089* (2013.01); *F28F 2255/16* (2013.01)

(56) References Cited

FOREIGN PATENT DOCUMENTS

| | | |
|---|---|---|
| JP | 7-124787 A | 5/1995 |
| JP | 11-000790 A | 1/1999 |
| JP | 2011-007383 A | 1/2011 |
| JP | 2011-007384 A | 1/2011 |
| JP | 2012-112000 A | 6/2012 |

* cited by examiner

PROCESS FOR PRODUCING ALUMINUM ALLOY TUBE HAVING SACRIFICIAL ANTICORROSION LAYER AND JOINING LAYER

TECHNICAL FIELD

The present invention relates to an aluminum alloy tube (hereinafter also referred to as "tube") having a sacrificial anticorrosion layer and a joining layer.

BACKGROUND ART

In general, aluminum alloy heat exchangers are manufactured by brazing. A paste brazing material, a brazing material foil, a brazing sheet and the like are used in brazing. In particular, when joining an extrusion tube and a fin, clad fin (that is, a brazing sheet) is generally used.

A brazing sheet is a clad material comprising an aluminum alloy plate as a core, one side or both sides of the core being applied with a brazing material. With respect to the brazing sheet used for the heat exchanger, 4000 series aluminum alloy is applied as the brazing material on one side or both sides of the core.

For tubes made by sheet forming, the brazing sheet can be used, and a mono-layer material or a clad material can be selected for tubes, inner fins, and outer fins.

However, when an extrusion tube, particularly an extrusion material having complicated cross-sectional shape, is intended to clad, the metal cannot be uniformly clad during extrusion, thereby forming a mixture of different alloys at some portions. Therefore, extrusion tubes with simple shapes can only be clad. For example, clad materials can be manufactured for round tubes. However, tubes with complicated cross-sectional shapes such as oblate shapes that are used for heat exchangers, cannot be clad. That is, when a heat exchanger using an extrusion tube is manufactured, fins are generally used as the clad material when brazing is conducted, since the extrusion tubes cannot be clad.

A method for brazing extrusion tubes without using the brazing sheet has been suggested. For example, Patent Document 1 discloses a brazing method using a binder and an aluminum alloy powder for brazing. However, the specification merely mentions the viewpoint of joining, and there is no description regarding the corrosion resistance, which is an important issue in the heat exchanger.

PRIOR ART REFERENCE

Patent Document

Patent Document 1: JP-A-03-106595

SUMMARY OF THE INVENTION

Problems to be Solved by the Invention

As described, when a heat exchanger using an extrusion tube (particularly an oblate tube) was manufactured, a brazing sheet, which is a fin applied with a brazing material, has been generally used. However, the brazing sheet (clad material) is expensive compared with a mono-layered material (herein after referred to as a bare material) and is not easy to manufacture. Accordingly, use of the bare material as the fin has been considered. In addition, there has been a demand to allow the extrusion tube itself to have the brazing material applied thereon and to have the corrosion resistance.

The present invention has been made in view of such circumstances, and the object of the present invention is to provide an aluminum alloy tube with superior corrosion resistance and a joining layer for brazing. In addition, another object of the present invention is to provide a heat exchanger using a fin which utilizes a bare material of low cost and higher availability, rather than a clad material.

Means for Solving the Problems

According to the present invention, a manufacturing method of an aluminum alloy tube, comprising the steps of:

forming a sacrificial anticorrosion layer comprising Zn, by ark spraying Zn with purity of 95% or more, onto a surface of aluminum alloy tube with a spraying amount of 3 to 10 $g/m^2$ and a spraying speed of $150\times10^3$ to $350\times10^3$ mm/sec; and forming a joining layer for brazing by applying a joining material for brazing comprising a mixture obtained by mixing Si powder with purity of 95% or more and flux, onto a surface of the sacrificial anticorrosion layer, so that the amount of the Si powder is 1.2 to 3.0 $g/m^2$, is provided.

According to the present method, a sacrificial anticorrosive layer is provided onto the surface of the aluminum alloy tube beforehand, thereby improving corrosion resistance. Then, a brazing material is applied onto the tube to form a joining layer, thus providing the aluminum alloy tube with the joining layer. Accordingly, the aluminum alloy tube and the fin can be joined. Here, by controlling the spraying speed for forming the sacrificial anticorrosive layer, the sacrificial anticorrosive layer can be certainly and effectively formed onto the surface of the extrusion tube. Therefore, the present method can provide an aluminum alloy tube with superior corrosion resistance and a joining layer for brazing.

In addition, the present invention provides an aluminum alloy tube obtained by the afore-mentioned manufacturing method.

Since the present invention certainly and effectively forms the sacrificial anticorrosive layer onto the surface of the extrusion tube by controlling the spraying speed for forming the sacrificial anticorrosive layer in the afore-mentioned manufacturing method, an aluminum alloy tube with superior corrosion resistance and a joining layer for brazing can be provided.

In addition, according to the present invention, a heat exchanger comprising:

an aluminum alloy tube obtained by the afore-mentioned manufacturing method; and a fin comprising a bare material of aluminum alloy; wherein the fin is brazed onto the aluminum alloy tube, is provided.

Since the present invention uses an aluminum alloy tube with a sacrificial anticorrosion layer having superior corrosion resistance and an a joining layer for brazing, a heat exchanger using a fin which utilizes a bare material of low cost and higher availability, rather than a clad material, can be provided.

Effect of the Invention

According to the present invention, an aluminum alloy tube with a sacrificial anticorrosion layer with superior corrosion resistance and a joining layer for brazing can be provided. In addition, according to the present invention, a heat exchanger using a fin which utilizes a bare material of low cost and higher availability, rather than a clad material, can be provided.

EMBODIMENT OF THE INVENTION

Hereinafter, the embodiments of the present invention will be described with reference to figures. Here, in all of the figures, similar constituents are provided with the same reference numbers, and the explanation is omitted. In the present embodiment, "A to B" means A or more and B or less.

Figure 1:
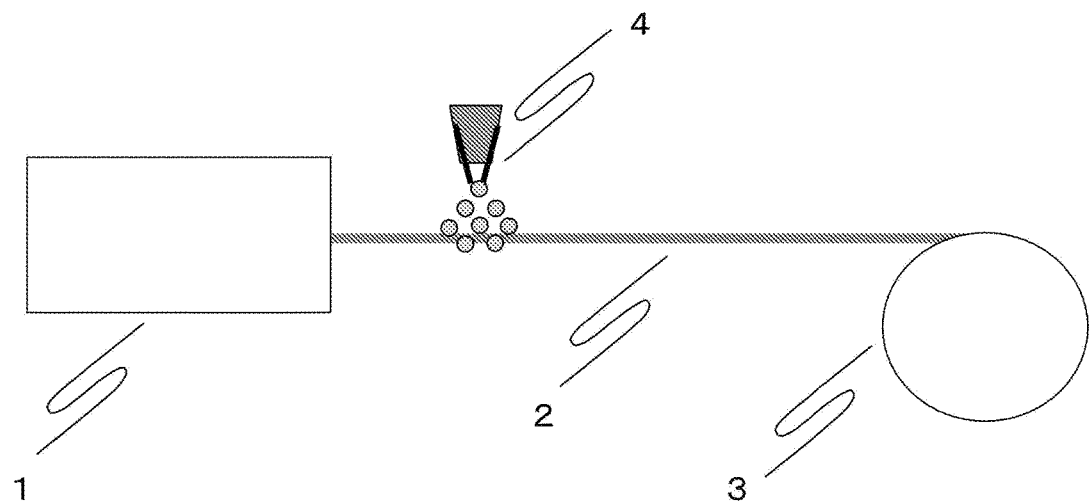
FIG. 1 shows a spraying step of the present embodiment, which is for spraying a sacrificial anticorrosive layer onto the surface of an aluminum alloy tube.
Figure 2:
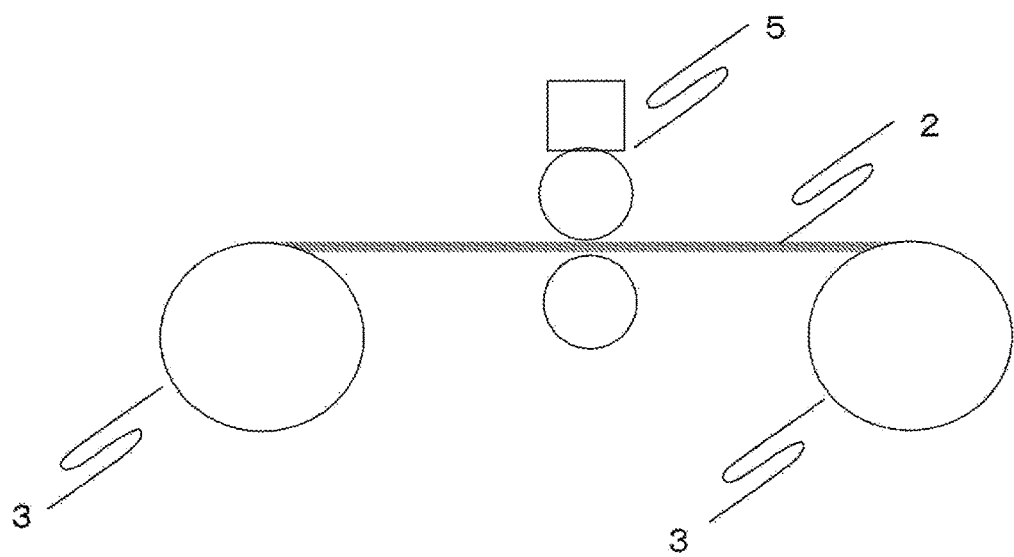
FIG. 2 shows a coating step of the present embodiment, which is for coating a joining layer including a joining material for brazing onto the surface of the sacrificial anticorrosion layer of the aluminum alloy tube.
Figure 3:
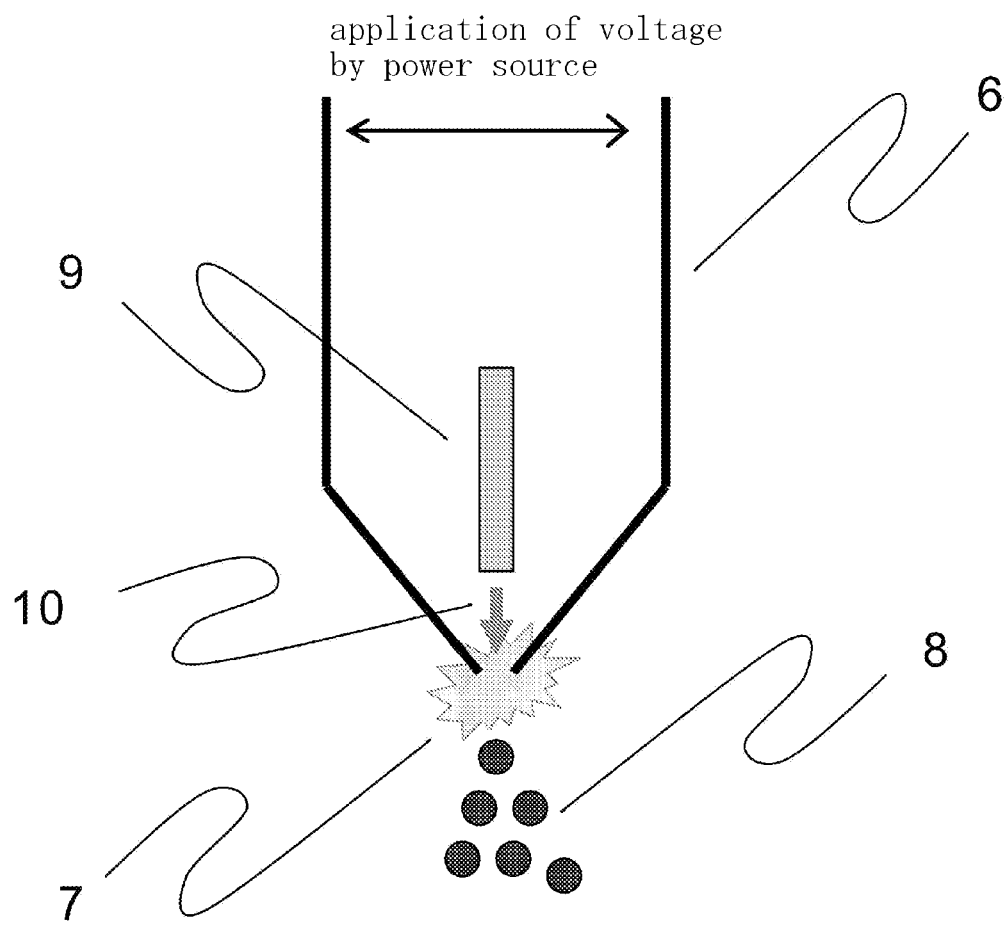
FIG. 3 shows a spraying system for spraying the sacrificial anticorrosion layer onto the surface of the aluminum alloy tube without the sacrificial anticorrosion layer.

FIGS. 1 and 2 are schematic drawings of the spraying step and the coating step, respectively. FIG. 3 shows a spraying system. In the manufacturing method of the aluminum alloy tube of the present embodiment, the sacrificial anticorrosion layer and the joining layer for brazing are formed onto the aluminum alloy tube, thereby allowing to manufacture the heat exchanger without using the crad material for the fin and to obtain the aluminum alloy tube for the heat exchanger having superior corrosion resistance. Here, it is preferable to use the extrusion tube as the aluminum alloy tube in order to improve productivity.

In the present embodiment, the sacrificial anticorrosion layer is formed onto the surface of the tube immediately after extrusion by spraying Zn. Subsequently, a mixture of a brazing material such as Si, a flux, and a binder is applied onto the surface of the sacrificial anticorrosion layer, thereby forming the joining layer (brazing material). Then, the tube is combined with the bare fin and subjected to heat treatment for 3 to 5 minutes under 595 to 605° C. to obtain the heat exchanger having the tube joined with the fin.

<Sacrificial Layer>

The sacrificial layer is formed by spraying Zn onto the surface of the aluminum alloy tube. First, an arc discharge is ignited in a spraying system, and the solid Zn is melted by the discharge energy. Then, the melted Zn is sprayed onto the surface of the tube by compressed air, thereby forming the sacrificial layer onto the surface of the tube.

Since Zn is an element with electronegative potential, the Zn sacrificial layer formed onto the surface of the aluminum alloy tube would allow the sacrificial layer to be preferentially corroded. Accordingly, the corrosion of the aluminum alloy tube can be prevented. By the heat treatment of brazing to join the tube and the fin to obtain the heat exchanger, the sprayed Zn diffuse into the aluminum alloy tube, thereby achieving the anticorrosion effect due to the concentration gradient of Zn between the aluminum alloy tube and the sacrificial layer.

The sacrificial anticorrosion layer is formed by adjusting the amount of Zn during spraying at 3 to 10 g/m². When the amount of Zn is less than 3 g/m², the anticorrosion effect is small. When the amount of Zn is more than 10 g/m², the concentration of Zn after the heat treatment of brazing becomes high. In particular, the Zn concentration in the fillet formed when the tube and the fin are joined becomes extremely high, and thus the fin may come off. Here, the amount of Zn during the spraying may be in the range between the two values selected from 3 g/m², 4 g/m², 5 g/m², 6 g/m², 7 g/m², 8 g/m², 9 g/m², and 10 g/m².

In addition, by adjusting the amount of Zn to 3 to 10 g/m², the depth of the Zn diffusion layer from the surface of the tube can be adjusted to 50 to 200 μm and the Zn concentration at the surface of the tube can be adjusted to 0.5 to 5.0 wt %. Accordingly, the anticorrosion property of the aluminum alloy tube can be improved. Here, the depth of the Zn diffusion layer may be in the range between the two values selected from 50 μm, 60 μm, 70 μm, 80 μm, 90 μm, 100 μm, 110 μm, 120 μm, 130 μm, 140 μm, 150 μm, 160 μm, 170 μm, 180 μm, 190 μm, and 200 μm. The Zn concentration at the surface of the tube may be in the range between the two values selected from 0.5 wt %, 1.0 wt %, 1.5 wt %, 2.0 wt %, 2.5 wt %, 3.0 wt %, 3.5 wt %, 4.0 wt %, 4.5 wt %, and 5.0 wt %.

Here, it is preferable that Zn used has high purity. The effect as the sacrificial anticorrosion layer can be obtained with the purity of 95% or higher. When the purity is lower than 95%, the effect as the sacrificial anticorrosion layer becomes low. The content other than Zn is Al, Fe, and the like.

It is preferable that the extrusion tube subjected to spraying is kept at a high temperature. Generally, the temperature of the tube immediately after extrusion is approximately 450° C., and the present invention utilizes the heat of such tube immediately after the extrusion. When the temperature is lower than the melting point of Zn, the heat of Zn is rapidly taken by the extrusion tube when Zn comes into contact with the surface of the extrusion tube. This would lead to low adhesion.

<Spraying Speed>

Since the spraying of Zn onto the extrusion tube utilizes the remaining heat of the extrusion step, the spraying is carried out by transferring the extrusion tube on the line of the manufacture process. The spraying speed of Zn is by far faster than the speed of the manufacturing line where the extrusion tube is transferred. Therefore, the sacrificial anticorrosion layer can be efficiently formed onto the surface of the extrusion tube by controlling the spraying speed.

The spraying speed of Zn shall be adjusted to $150 \times 10^3$ to $350 \times 10^3$ mm/sec. When the spraying speed is faster than $350 \times 10^3$ mm/sec, the number of Zn particles sprayed per unit time becomes large, resulting in lower production yield and increase in cost. In addition, the influence of the blow toward the material being sprayed becomes large, causing the material to fluctuate largely, thereby bringing an adverse effect in the formation of the sacrificial anticorrosion layer. On the other hand, when the spraying speed is slower than $150 \times 10^3$ mm/sec, the adherence of Zn to the material lowers. In addition, the amount of Zn sprayed becomes insufficient, and thus portions where the sacrificial anticorrosion layer is not formed would appear onto the surface of the extrusion tube. Here, the spraying speed of Zn may be in the range between the two values selected from $150 \times 10^3$ mm/sec, $175 \times 10^3$ mm/sec, $200 \times 10^3$ mm/sec, $225 \times 10^3$ mm/sec, $250 \times 10^3$ mm/sec, $275 \times 10^3$ mm/sec, $300 \times 10^3$ mm/sec, $325 \times 10^3$ mm/sec, and $350 \times 10^3$ mm/sec.

From the viewpoint of preventing Zn from being oxidized during the spraying, the gas used for spraying Zn particles is preferably an inert gas rather than air.

<Joining Layer>

The joining layer is formed onto the surface of the sacrificial layer and is used for brazing the aluminum alloy tube and the fin. The joining layer comprises a joining material for brazing. Here, Si powder is used as the joining material for brazing. It is preferable to mix flux for improving the brazing property of the joining material for brazing. In addition, it is preferable to formulate a binder to ease the mixing of Si powder and the flux and to ease the application.

<Si Powder>

Si powder functions as the brazing material during brazing. By applying the Si powder onto the surface of the aluminum alloy tube, the fin can be made as a mono-layer material. When the amount of Si powder being applied onto the surface of the sacrificial layer on the aluminum alloy tube is adjusted to 1.2 to 3 $g/m^2$, the tube can be excellently joined with the fin by brazing. When the amount of Si powder being applied is less than 1.2 $g/m^2$, the fillet is hardly formed, and thus defect in joining of the tube and the fin arises. On the other hand, when the amount of Si powder being applied is more than 3 $g/m^2$, corrosion occurs at the tube and the fin, thereby affecting the anticorrosion property. Here, the amount of the Si powder being applied may be in the range between the two values selected from 1.2 $g/m^2$, 1.4 $g/m$ $g/m^2$, 1.6 $g/m^2$, 1.8 $g/m^2$, 2.0 $g/m^2$, 2.2 $g/m^2$, 2.4 $g/m^2$, 2.6 $g/m^2$, 2.8 $g/m^2$, and 3.0 $g/m^2$.

Here, it is preferable that Si used has high purity. Contribution to excellent joining property can be obtained with the purity of 95% or higher. The content other than Si is Al, Fe, and the like.

The particle diameter of the Si powder is preferably 50 μm or smaller. When the particle diameter is large, the joining layer is prone to having spots, and the surface of the aluminum alloy tube after brazing becomes prone to corrosion. Here, the particle diameter is the volume average particle diameter, and the particle diameter is defined as the volume average particle diameter also in the Examples. The volume average particle diameter can be measured by a sieve method, a natural sedimentation method, a centrifugal sedimentation method, a coulter method (coulter principle), a dynamic light scattering method, an image analysis method, a laser diffraction scattering method, or the latest super centrifugal sedimentation method. Among these, it is particularly preferable that the measurement is carried out with the laser diffraction scattering method.

In addition, it is preferable that the proportion of the Si particle having a particle diameter of 1.0 to 7.0 μm is 50% or more of the entire Si powder. When the particle diameter is smaller than 1.0 μm, an aggregate forms when it is mixed with the flux and the binder. This would result in formation of spots when the Si powder is applied onto the surface of the sacrificial layer on the aluminum alloy tube. When the particle diameter is larger than 7.0 μm, the aluminum alloy may suffer corrosion at such portion. Therefore, the aforementioned disadvantages can be prevented by adjusting the proportion of the Si particle having a particle diameter of 1.0 to 7.0 μm to be 50% or more. This proportion is a volume proportion, and the proportion is defined as the volume proportion also in the Examples described later. The volume proportion can be calculated by measuring the particle size distribution using the dynamic light scattering method.

<Flux>

Flux functions to break the oxide film when the tube and the fin are joined during the brazing. In general, a fluoride flux including a compound of K, Al, and F is used. A specific preferable example of such fluoride flux include $KAlF_4$, $K_2AlF_6 \cdot H_2O$, $K_2AlF_6 \cdot 5H_2O$, $K_3AlF_6$, and $AlF_3$.

<Mixture>

In the present invention, a mixture refers to the one obtained by mixing Si powder and a flux. It is preferable to adjust the formulation ratio (mass ratio) of the Si powder and the flux to 1:2 to 1:3. In the Examples described later, the formulation ratio of the Si powder and the flux is defined by mass ratio. When the flux is less than the provided ratio, the effect of removing the oxide film is weak, and thus insufficient brazing may occur. When the flux is more than the provided ratio, a large amount or residual flux remains on the product after brazing, and there may be a case where insufficient brazing occurs. Here, the formulation ratio (mass raio) may be in the range between the two values selected from 1:2, 1:2.1, 1:2.2, 1:2.3, 1:2.4, 1:2.5, 1:2.6, 1:2.7, 1:2.8, 1:2.9, and 1:3.0.

<Binder>

A resin-based binder is used as the binder. Here, there is no particular limitation for the type of the binder, and shall be selected regarding to the application.

The embodiments of the present invention have been described with reference to figures, however, the embodiments were illustrated for exemplification, and various constituents other than those mentioned above can be adopted.

For example, in the afore-mentioned embodiment, the spraying and the coating systems were as shown in FIG. 1 to FIG. 3, however, the spraying and the coating systems may be of any kind. What is important is the each of the steps, and a cooling system after the spraying, a drying system after the coating may be arranged as necessary. In addition, FIG. 1 and FIG. 2 show the spraying step and the coating step separately, however, they may be combined.

EXAMPLES

Hereinafter, the present invention will be described with reference to the Examples, however, the present invention shall not be limited to these Examples.

Example 1

Figure 4:
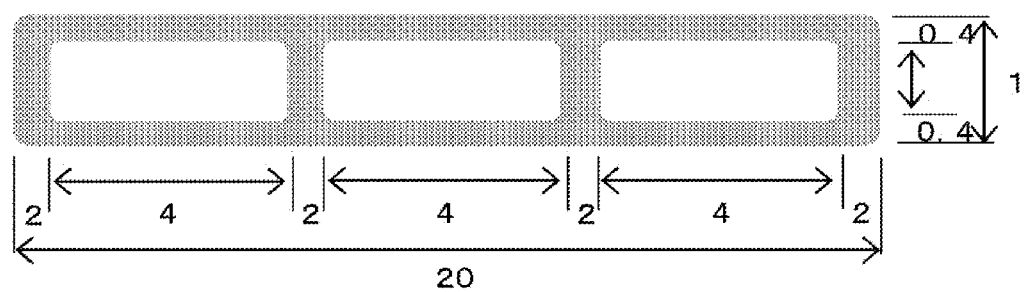
FIG. 4 is a cross-sectional view of an oblate tube used in the present embodiment, having three hollow portions with the same interval.

A1050 was melt to obtain an ingot having a diameter of 220 mm. Extrusion was carried out by usual method. In the present Example, an extruding dice with four forming openings was used, and identical tubes were extruded simultaneously. The tubes were oblate tubes. As shown in FIG. 4, the oblate tube had an external size of 20(W)×1.8(H) having three hollow portions with the size of 4.0(W)×1.0(H) arranged with the same intervals.

As shown in FIG. 1 and FIG. 3, the tube immediately after extrusion was subjected to Zn spraying step. When Zn was sprayed, the amount of air blown from the air nozzle was adjusted to $100 \times 10^3$ to $400 \times 10^3$ mm/sec, and the amount of Zn sprayed was adjusted to 1 to 15 $g/m^2$. After the spraying, the tube was wound into a coil and was then transferred to the coating system. There, a roll coater was used to apply a coating obtained by mixing the Si powder, the flux, and the binder, onto the surface of the tube applied with Zn. The amount of the coating was adjusted to 1 to 15 $g/m^2$. Here, the purity of the Zn and Si powders were 70% and 95%, respectively.

Table 1 to Table 4 show the results obtained by the evaluation of the cores obtained by varying the spraying amount, application amount, purity and the like of Zn powder and Si powder, and then carrying out the brazing under the same brazing conditions of 600° C. for 3 minutes.

When conducting the evaluation, the materials thus obtained was cut into length of L=100 mm, and the fin (20 ridges) manufactured with the aluminum alloy was fixed in between two tubes with a jig, followed by heat treatment of brazing at 600° C. for 3 minutes to give the cores for evaluation.

(1) Anticorrosion Property (Corrosion Test)

SWAAT test was carried out for 500 hours with the cores thus obtained.

Residue Thickness:

As the criteria for evaluation, when the thickness of the tube after the test with respect to the thickness before the test t was ⅔t or more, it was evaluated as "excellent". When the thickness of the tube after the test was less than ⅔t, it was evaluated as "poor".

Tearing Off of Fins:

The tearing off of the fins after the corrosion test was also conducted, and when the tearing off of the fins was less than ¼, it was evaluated as "excellent", and when the tearing off of the fins was ¼ or more, it was evaluated as "poor".

In the table, the results of the evaluation for the anticorrosion property is a combined results of the residue thickness and the tearing off of the fins. When both of the evaluation results for the residue thickness and the tearing off of the fins were "excellent", the anticorrosion property was evaluated as passed "excellent". When at least one of the residue thickness or the tearing off of the fins was "poor", the anticorrosion property was evaluated as not passed "poor".

(2) Brazing Property (Joining Condition)

The fin after the brazing was torn off, and the joining rate of the fin was observed. Here, the joining rate is defined as the percent representation of the number of ridges that was not joined subtracted from the number of ridges that is supposed to be joined (20 ridges), divided by the number of the ridges of the fin (20 ridges). When the joining rate was 90% or more, it was evaluated as "excellent", when the joining rate was 80% or more, it was evaluated as "good", and when the joining rate was less than 80%, it was evaluated as "poor".

(3) Corrosion Property (Corrosion of the Tube and Fin after Brazing)

The surface of the tube was observed using an optical microscope after brazing, and the cross section of the portions with deep corrosion was observed. The depth of the corrosion was measured by focal depth method. When the depth of the corrosion was less than 25 μm, it was evaluated as passed "excellent", and when the depth of the corrosion was 25 μm or more and less than 50 μm, it was evaluated as passed "good", and when the depth of the corrosion was 50 μm or more, it was evaluated as not passed "poor".

In addition, the corrosion of the fin was observed for the cross section in the longitudinal direction of the tube (the center of the tube in the width direction). When no corrosion was observed, it was evaluated as "excellent", and when corrosion was observed, it was evaluated as "poor".

The corrosion property of the Examples were evaluated in accordance with the observation results of the corrosion in the tube and the corrosion in the fin. When both of the results were "excellent", the corrosion property was evaluated as passed (as shown as "excellent" in Table 2), when the result for the corrosion of the tube was "good" and the corrosion of the fin was "excellent", the corrosion property was evaluated as passed (as shown as "good" in Table 2), and when both of the results or either one of the result was "poor", the corrosion property was evaluated as not passed (as shown as "poor" in Table 2).

TABLE 1

| | | Zn | | | Si | | | |
| --- | --- | --- | --- | --- | --- | --- | --- | --- |
| | | | | | | | Proportion of | |
| | Purity(%) | Spraying Amount (g/m$^2$) | Spraying Speed ×10$^3$ (mm/sec) | Purity(%) | Formulation Amount of Si | Particle Diameter (μm) | Particles With Diameter of 1.0 to 7.0 μm | Ratio With Flux |
| Example 1 | 95 | 3 | 250 | 95 | 2.4 | 50 μm or less | 50% or more | 1:3 |
| 2 | 95 | 10 | 250 | 95 | 3.0 | 50 μm or less | 50% or more | 1:3 |
| 3 | 95 | 3 | 250 | 95 | 2.4 | 50 μm or less | 50% or more | 1:3 |
| 4 | 95 | 10 | 250 | 95 | 2.4 | 50 μm or less | 50% or more | 1:3 |
| 5 | 95 | 5 | 250 | 95 | 2.4 | 50 μm or less | 50% or more | 1:4 |
| 6 | 95 | 3 | 150 | 95 | 2.4 | 50 μm or less | 50% or more | 1:2 |
| 7 | 95 | 10 | 150 | 95 | 1.2 | 50 μm or less | 50% or more | 1:2 |
| 8 | 95 | 3 | 250 | 95 | 2.4 | 50 μm or less | 50% or more | 1:2 |
| 9 | 95 | 10 | 150 | 95 | 2.4 | 50 μm or less | 50% or more | 1:2 |
| 10 | 95 | 5 | 250 | 95 | 2.2 | 50 μm or less | 50% or more | 1:2 |
| 11 | 95 | 3 | 350 | 95 | 2.2 | 50 μm or less | 50% or more | 1:3 |
| 12 | 95 | 10 | 250 | 95 | 2.4 | 50 μm or less | 50% or more | 1:3 |
| 13 | 95 | 5 | 350 | 95 | 2.4 | 50 μm or less | 50% or more | 1:3 |
| 14 | 95 | 3 | 150 | 95 | 3.0 | 50 μm or less | 50% or more | 1:3 |
| 15 | 95 | 10 | 150 | 95 | 2.4 | 50 μm or less | 50% or more | 1:3 |
| 16 | 95 | 3 | 250 | 95 | 1.2 | 50 μm or less | less than 50% | 1:3 |
| 17 | 95 | 10 | 350 | 95 | 3.0 | 50 μm or less | less than 50% | 1:3 |
| 18 | 95 | 5 | 250 | 95 | 1.2 | 50 μm or less | less than 50% | 1:3 |
| 19 | 95 | 10 | 250 | 95 | 2.4 | 50 μm or less | less than 50% | 1:2 |

TABLE 2

| | | Evaluation Results (Brazing Conditions: 600° C. × 3 min) | | | | |
| --- | --- | --- | --- | --- | --- | --- |
| | | Anticorrosion Property | | | | |
| | | Tearing Off of Fins | Residue Thickness | Brazing Property | Corrosion Property | Overall Evaluation |
| Example | 1 | Excellent | Excellent | Excellent | Excellent | Excellent |
| | 2 | Excellent | Excellent | Excellent | Excellent | Excellent |
| | 3 | Excellent | Excellent | Excellent | Excellent | Excellent |
| | 4 | Excellent | Excellent | Excellent | Excellent | Excellent |

TABLE 2-continued

Evaluation Results
(Brazing Conditions: 600° C. × 3 min)

Anticorrosion Property

| | Tearing Off of Fins | Residue Thickness | Brazing Property | Corrosion Property | Overall Evaluation |
|---|---|---|---|---|---|
| 5 | Excellent | Excellent | Good | Excellent | Excellent |
| 6 | Excellent | Excellent | Excellent | Excellent | Excellent |
| 7 | Excellent | Excellent | Excellent | Excellent | Excellent |
| 8 | Excellent | Excellent | Excellent | Excellent | Excellent |
| 9 | Excellent | Excellent | Excellent | Excellent | Excellent |
| 10 | Excellent | Excellent | Excellent | Excellent | Excellent |
| 11 | Excellent | Excellent | Excellent | Excellent | Excellent |
| 12 | Excellent | Excellent | Excellent | Excellent | Excellent |
| 13 | Excellent | Excellent | Excellent | Excellent | Excellent |
| 14 | Excellent | Excellent | Excellent | Excellent | Excellent |
| 15 | Excellent | Excellent | Excellent | Excellent | Excellent |
| 16 | Excellent | Excellent | Good | Good | Excellent |
| 17 | Excellent | Excellent | Good | Good | Excellent |
| 18 | Excellent | Excellent | Good | Good | Excellent |
| 19 | Excellent | Excellent | Good | Good | Excellent |

TABLE 4

Evaluation Results
(Brazing Conditions: 600° C. × 3 min)

Anticorrosion Property

| | | Tearing Off of Fins | Residue Thickness | Brazing Property | Corrosion Property | Overall Evaluation |
|---|---|---|---|---|---|---|
| Comparison Example | 20 | Excellent | Poor | Excellent | Excellent | Poor |
| | 21 | Excellent | Poor | Excellent | Excellent | Poor |
| | 22 | Excellent | Poor | Excellent | Excellent | Poor |
| | 23 | Excellent | Poor | Excellent | Excellent | Poor |
| | 24 | Excellent | Poor | Excellent | Excellent | Poor |
| | 25 | Excellent | Poor | Excellent | Excellent | Poor |
| | 26 | Excellent | Poor | Excellent | Excellent | Poor |
| | 27 | Excellent | Poor | Excellent | Excellent | Poor |
| | 28 | Excellent | Excellent | Poor | Excellent | Poor |
| | 29 | Excellent | Excellent | Poor | Excellent | Poor |
| | 30 | Excellent | Excellent | Poor | Excellent | Poor |
| | 31 | Excellent | Excellent | Poor | Excellent | Poor |
| | 32 | Excellent | Excellent | Poor | Excellent | Poor |
| | 33 | Excellent | Excellent | Poor | Excellent | Poor |
| | 34 | Excellent | Excellent | Poor | Excellent | Poor |
| | 35 | Excellent | Excellent | Poor | Excellent | Poor |

TABLE 3

| | | Zn | | | Si | | | | |
|---|---|---|---|---|---|---|---|---|---|
| | | Purity(%) | Spraying Amount (g/m$^2$) | Spraying Speed ×10$^3$ (mm/sec) | Purity(%) | Formulation Amount of Si | Particle Diameter (μm) | Proportion of Particles With Diameter of 1.0 to 7.0 μm | Ratio With Flux |
| Comparison Example | 20 | 70 | 3 | 250 | 95 | 2.4 | 50 μm or less | 50% or more | 1:3 |
| | 21 | 70 | 10 | 250 | 95 | 2.4 | 50 μm or leas | 50% or more | 1:3 |
| | 22 | 70 | 3 | 250 | 95 | 2.4 | 50 μm or less | 50% or more | 1:3 |
| | 23 | 70 | 10 | 250 | 95 | 2.4 | 50 μm or less | 50% or more | 1:3 |
| | 24 | 70 | 3 | 250 | 95 | 2.4 | 50 μm or less | 50% or more | 1:2 |
| | 25 | 70 | 10 | 250 | 95 | 2.4 | 50 μm or less | 50% or more | 1:2 |
| | 26 | 70 | 3 | 250 | 95 | 2.4 | 50 μm or less | 50% or more | 1:2 |
| | 27 | 70 | 10 | 250 | 95 | 2.4 | 50 μm or less | 50% or more | 1:2 |
| | 28 | 95 | 3 | 150 | 70 | 2.4 | 50 μm or less | 50% or more | 1:3 |
| | 29 | 95 | 10 | 250 | 70 | 2.4 | 50 μm or less | 50% or more | 1:3 |
| | 30 | 95 | 3 | 350 | 70 | 2.4 | 50 μm or less | 50% or more | 1:3 |
| | 31 | 95 | 10 | 250 | 70 | 1.2 | 50 μm or less | 50% or more | 1:3 |
| | 32 | 95 | 3 | 250 | 70 | 2.4 | 50 μm or less | 50% or more | 1:2 |
| | 33 | 95 | 10 | 250 | 70 | 2.4 | 50 μm or less | 50% or more | 1:2 |
| | 34 | 95 | 3 | 250 | 70 | 3.5 | 50 μm or less | 50% or more | 1:2 |
| | 35 | 95 | 10 | 250 | 70 | 0.8 | 50 μm or less | 50% or more | 1:2 |
| | 36 | 70 | 5 | 250 | 95 | 2.4 | more than 50 μm | less than 50% | 1:3 |
| | 37 | 70 | 5 | 250 | 95 | 2.4 | more than 50 μm | less than 50% | 1:2 |
| | 38 | 95 | 1 | 250 | 95 | 2.4 | 50 μm or less | 50% or more | 1:3 |
| | 39 | 95 | 15 | 250 | 95 | 3.0 | 50 μm or less | 50% or more | 1:2 |
| | 40 | 95 | 1 | 250 | 95 | 2.4 | 50 μm or less | 50% or more | 1:3 |
| | 41 | 95 | 15 | 250 | 95 | 2.4 | 50 μm or less | 50% or more | 1:2 |
| | 42 | 95 | 5 | 360 | 95 | 2.4 | 50 μm or less | 50% or more | 1:5 |
| | 43 | 95 | 3 | 360 | 95 | 2.4 | 50 μm or less | 50% or more | 1:3 |
| | 44 | 95 | 10 | 360 | 95 | 3.0 | 50 μm or less | 50% or more | 1:3 |
| | 45 | 95 | 5 | 400 | 95 | 2.4 | 50 μm or less | 50% or more | 1:3 |
| | 47 | 95 | 3 | 400 | 95 | 2.4 | 50 μm or less | 50% or more | 1:3 |
| | 48 | 95 | 10 | 400 | 95 | 3.0 | 50 μm or less | 50% or more | 1:3 |
| | 49 | 95 | 5 | 140 | 95 | 2.4 | 50 μm or less | 50% or more | 1:3 |
| | 50 | 95 | 3 | 140 | 95 | 2.4 | 50 μm or less | 50% or more | 1:3 |
| | 51 | 95 | 10 | 140 | 95 | 2.4 | 50 μm or less | 50% or more | 1:3 |
| | 52 | 95 | 5 | 100 | 95 | 2.4 | 50 μm or less | 50% or more | 1:3 |
| | 53 | 95 | 3 | 100 | 95 | 2.4 | 50 μm or less | 50% or more | 1:3 |
| | 54 | 95 | 10 | 100 | 95 | 2.4 | 50 μm or less | 50% or more | 1:3 |

TABLE 4-continued

Evaluation Results
(Brazing Conditions: 600° C. × 3 min)

| | Anticorrosion Property | | | | |
|---|---|---|---|---|---|
| | Tearing Off of Fins | Residue Thickness | Brazing Property | Corrosion Property | Overall Evaluation |
| 36 | Excellent | Excellent | Excellent | Poor | Poor |
| 37 | Excellent | Excellent | Excellent | Poor | Poor |
| 38 | Excellent | Poor | Poor | Excellent | Poor |
| 39 | Poor | Excellent | Excellent | Excellent | Poor |
| 40 | Excellent | Poor | Excellent | Excellent | Poor |
| 41 | Poor | Excellent | Excellent | Excellent | Poor |
| 42 | Poor | Excellent | Poor | Excellent | Poor |
| 43 | Poor | Excellent | Excellent | Excellent | Poor |
| 44 | Poor | Excellent | Excellent | Excellent | Poor |
| 45 | Poor | Excellent | Excellent | Excellent | Poor |
| 47 | Poor | Excellent | Excellent | Excellent | Poor |
| 48 | Poor | Excellent | Excellent | Excellent | Poor |
| 49 | Excellent | Poor | Excellent | Excellent | Poor |
| 50 | Excellent | Poor | Excellent | Excellent | Poor |
| 51 | Excellent | Poor | Excellent | Excellent | Poor |
| 52 | Excellent | Poor | Excellent | Excellent | Poor |
| 53 | Excellent | Poor | Excellent | Excellent | Poor |
| 54 | Excellent | Poor | Excellent | Excellent | Poor |

The Examples and Comparative Examples shown in Table 1 will be explained.

Examples 1 to 19 have the Zn spraying amount, Zn purity and Si application amount, purity of Si powder, particle diameter of Si powder, and the formulation ratio of Si powder and flux in the predetermined range, and thus the overall evaluation were "passed".

Comparative Examples 20 to 27 had low Zn purity as 70%, and thus anticorrosion property was "not passed".

Comparative Examples 28 to 35 had low Si powder purity as 70%, and thus anticorrosion property and the joining property were "not passed". In addition, Comparative Example 34 had a large formulation amount of Si powder, and thus corrosion property was also "not passed", and Comparative Example 35 had a small formulation amount of Si powder, and thus joining property was "not passed".

Comparative Examples 36 and 37 had low Zn purity and thus anticorrosion property were "not passed". In addition, the particle diameter of the Si powder was large, and thus it was evaluated as "not passed".

The spraying amount of Zn was small or large in Comparative Examples 38 and 40, and thus the anticorrosion property was "not passed". In addition, the spraying amount of Zn was large in Comparative Examples 39 and 41, and thus the anticorrosion property was "not passed".

The amount of air blown from the spraying machine in Comparative Examples 42 to 48 was large, and thus Zn adhered to the tube was not uniform. Accordingly, the anticorrosion property was "not passed". In addition, the formulation ratio of Si powder and flux in Comparative Example 42 was outside the predetermined range, and thus the joining property was "not passed".

The amount of air blown from the spraying machine in Comparative Examples 49 to 54 was small, and thus Zn adhered to the tube was not uniform. Accordingly, the anticorrosion property was "not passed".

The present invention has been described with reference to Examples. These Examples are merely an example, and various alteration can be conducted. Person having ordinary skill in the art shall understand that such alterations are included in the present invention.

EXPLANATION OF SYMBOLS

1 extrusion machine
2 Al tube
3 recoiler or uncoiler
4 spraying system
5 coating system
6 Zn wire for spraying
7 melting of Zn by discharge
8 melt Zn being sprayed
9 machine for generation of air or inert gas and blow
10 flow of air or inert gas

The invention claimed is:

1. A manufacturing method of an aluminum alloy tube, comprising the steps of:
   forming a sacrificial anticorrosion layer comprising Zn, by ark spraying Zn with purity of 95% or more, onto a surface of aluminum alloy tube with a spraying amount of 3 to 10 g/m² and a spraying speed of $150 \times 10^3$ to $350 \times 10^3$ mm/sec; and
   forming a joining layer for brazing by applying a joining material for brazing comprising a mixture obtained by mixing Si powder with purity of 95% or more and flux, onto a surface of the sacrificial anticorrosion layer, so that the amount of the Si powder is 1.2 to 3.0 g/m².

2. The manufacturing method of claim 1, wherein:
   the flux is a fluoride flux including a compound of K, Al, and F; and
   a formulation ratio of the Si powder and the flux is 1:3 to 1:2.

3. The manufacturing method of claim 1, wherein:
   a particle diameter of the Si powder is 50 μm or less; and
   a proportion of Si powder having a particle diameter of 1.0 to 7.0 μm is 50% or more.

4. The manufacturing method of claim 3, wherein the sacrificial anticorrosion layer is formed by spraying Zn onto a surface of an extruded aluminum alloy at the temperature of 450° C. or higher.

* * * * *